No. 617,869. Patented Jan. 17, 1899.
A. VANDERBEEK.
UNIVERSAL JOINT FOR SHAFTING, &c.
(Application filed Oct. 12, 1898.)
(No Model.)
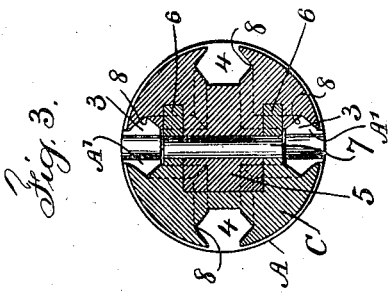
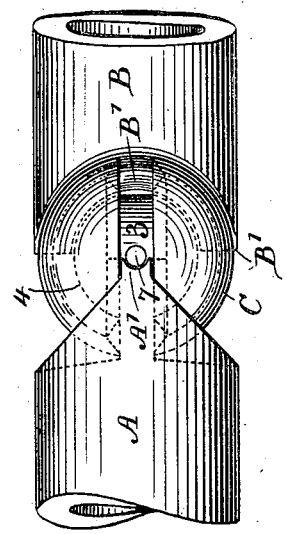
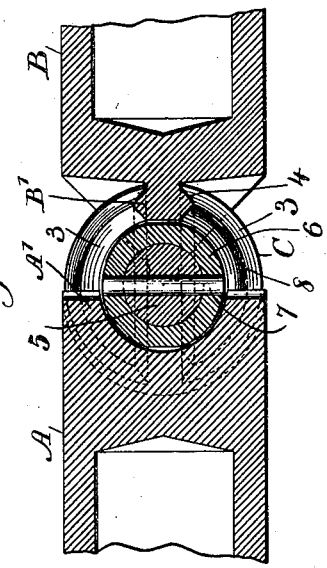
Witnesses
Chas H Smith
J. Staib
Inventor
Abraham Vanderbeek
per L. W. Serrell & Son
attys

UNITED STATES PATENT OFFICE.

ABRAHAM VANDERBEEK, OF HARTFORD, CONNECTICUT.

UNIVERSAL JOINT FOR SHAFTING, &c.

SPECIFICATION forming part of Letters Patent No. 617,869, dated January 17, 1899.

Application filed October 12, 1898. Serial No. 693,295. (No model.)

*To all whom it may concern:*

Be it known that I, ABRAHAM VANDERBEEK, a citizen of the United States, residing at Hartford, in the county of Hartford and State of Connecticut, have invented an Improvement in Universal Joints for Shafting, &c., of which the following is a specification.

Couplings and universal joints have been made in which a ball is received between forked plates at right angles to each other and passing into grooves in the ball, and in some instances these grooves have been undercut, as in Letters Patent No. 433,304, the forked plates having T-shaped segments to pass into the undercut grooves. In this character of flexible couplings the undercut grooves serve to weaken the ball, and in addition they are liable to become wedged where there is not sufficient lubrication, and there is undue friction resulting from the torsion, tending to press the ends of the segments against the ball. In the present instance I make a ball in parts that are put together similar to the ball in the Patent No. 433,304; but in place of using undercut rectangular grooves and segments upon the fork I make the grooves themselves diamond-shaped or with inclined faces sectionally, and the segmental forks are of a corresponding shape. The consequence is that there is no risk of undue friction, because the pressure is always of one V-shaped or inclined surface against another, and the pressure at one side tends to lessen the pressure at the opposite side of the V-shaped or inclined segments. Thereby the segment can never become wedged even when not properly lubricated, and in addition to this the strength of the ball is fully maintained, because the slot is not undercut or widened at the inner portion, but is mostly widened at about half of its depth, and the pressure and wear are uniform.

In the drawings, Figure 1 is an elevation of the coupling or universal joint. Fig. 2 is a longitudinal section, and Fig. 3 a cross-section, and Figs. 4 and 5 represent sectional shapes that may be employed.

The couplings A and B are to be united by the ball C, and these couplings A and B should be upon a shaft that is rotated, so that the couplings and ball form a universal joint between the two parts of a shaft, or the connections can be applied wherever available.

In the drawings the couplings A B are represented as hollow or tubular to receive and be permanently connected to the respective ends of the shaft between which the universal joint forms the connection.

Upon the coupling A is the segmental fork A', and upon the coupling B is the segmental fork B', and in the ball the grooves 3 are at right angles to the grooves 4, such grooves passing completely around the ball, and for convenience of putting the parts together the ball is made in two parts, the part 5 being cylindrical and on one side of the half-ball and passing into a corresponding recess in the other half of the ball, and the two parts are connected by a pin 7, driven in, as illustrated in Fig. 3, and the recess for the part 5 is central in one half-ball, and the annular recess for the part 6 is in the other half-ball, so that the parts become permanently connected when the pin 7 is driven in.

The grooves 3 and 4 are diamond-shaped in their cross-section or made with inclined surfaces, as shown in Figs. 4 and 5, and the segmental forks A' and B' are shaped correspondingly, and these segmental forks are a semicircle, or nearly so, and are at right angles to each other. The consequence is that the grooves are the widest at 8 and about half-way of the depth of the grooves. Hence the segmental forks cannot be separated from the ball without taking the ball apart, and there is no opportunity for the segmental forks to become wedged in the grooves of the ball, and the full strength of the ball is maintained.

I claim as my invention—

1. The combination with the couplings having segmental forks, of the ball having grooves at right angles, the segmental forks and the grooves being approximately diamond-shaped in section, substantially as and for the purposes set forth.

2. The combination with the coupling having segmental forks, of the ball having grooves at right angles, the forks fitting in such grooves and the segmental forks and the grooves having inclined surfaces, substantially as and for the purposes set forth.

Signed by me this 6th day of September, A. D. 1898.

ABRAHAM VANDERBEEK.

Witnesses:
 LEMUEL W. SERRELL,
 CHAS. H. SMITH.